May 15, 1962      L. UPSHUR      3,034,336
TESTING APPARATUS AND METHOD AND SPECIMEN THEREFOR
Filed May 29, 1958      2 Sheets-Sheet 1
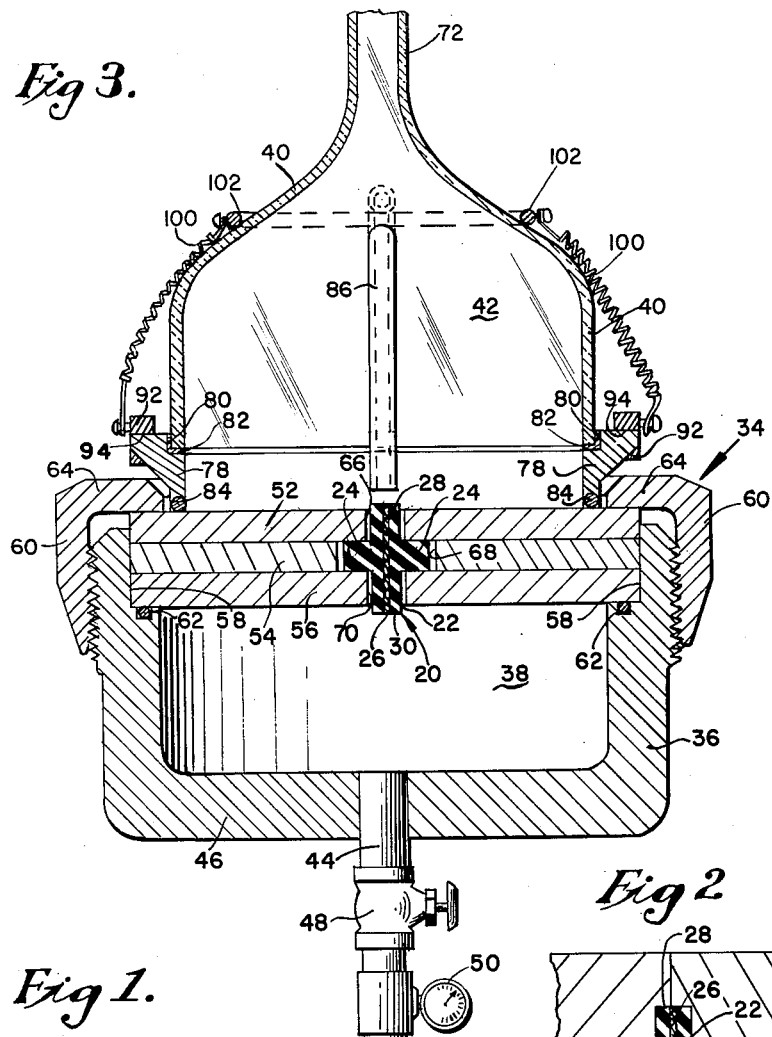
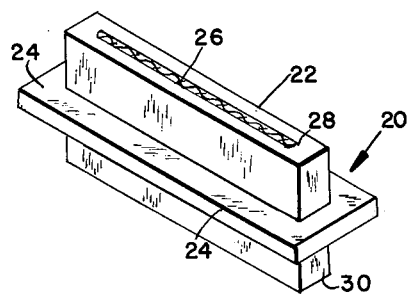
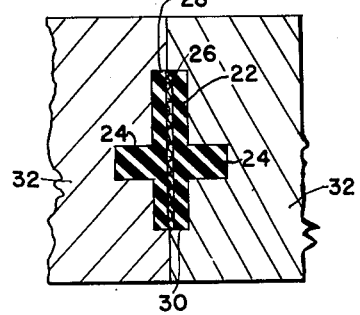
INVENTOR
LITTLETON UPSHUR
BY Cushman, Darby & Cushman
ATTORNEYS May 15, 1962 L. UPSHUR 3,034,336
TESTING APPARATUS AND METHOD AND SPECIMEN THEREFOR
Filed May 29, 1958 2 Sheets-Sheet 2

INVENTOR
LITTLETON UPSHUR

BY *Cushman, Darby & Cushman*
ATTORNEYS

United States Patent Office 3,034,336
Patented May 15, 1962

3,034,336
TESTING APPARATUS AND METHOD AND SPECIMEN THEREFOR
Littleton Upshur, Greensboro, N.C., assignor to Burlington Industries, Inc., Greensboro, N.C., a corporation of Delaware
Filed May 29, 1958, Ser. No. 738,662
3 Claims. (Cl. 73—38)

This invention pertains to the art of testing the air diffusion characteristics or permeability of materials.

A general object of the invention is to provide a novel apparatus and method for testing the permeability of materials. A more specific object is to design such an apparatus and method for particular adaptation to testing the permeability or air diffusion characteristics of so-called "chafer fabrics."

Chafer fabrics are commonly utilized in the manufacture of tires. As is understood, a strip or strips of fabric is or are normally applied in the bead area of the tire casing to control the chafing of the tire against the rim of the wheel. These strips are known as chafers or chafing strips.

Due to their construction and position in the tire, the danger of possible air leakage is presented when these fabrics are used in connection with tubeless tires. Unless the chafer fabrics are specially treated, air pressure from within the tire may be lost by a flow of air through the spaces between the individual filaments or fibers of the fabric threads.

To avoid this danger, it is customary to impregnate the fabric with suitable compounds in order to seal the fabric threads against any such air diffusion therethrough. After being impregnated, it is important that the fabrics be tested to determine the effectiveness of the impregnation.

Techniques heretofore proposed for testing these impregnated fabrics usually involve embedding a specimen of the fabric in rubber, exposing two opposite edges of the fabric, applying air pressure to one edge, and observing or measuring any air which comes out the opposite edge. These techniques do not always produce accurate results and for this and other reasons, they have not been found to be entirely satisfactory.

Hence, it is a further object of the invention to provide a novel structure for test specimens particularly suitable for facilitating and enhancing the operation of testing chafer fabrics. A related object resides in the provision of a novel test apparatus including means especially designed for convenient mounting of the specimen and for accurately measuring the permeability thereof.

A still further object resides in the provision of an efficient procedure for accurately testing the air diffusion characteristics of chafer fabrics by arranging for the construction of a molded test specimen of rubber having a chafer fabric embedded therein and an external circumscribing flange, and for the mounting of the specimen by means of the flange between a pressure chamber and a measuring chamber, with the only possible fluid communication between said chambers being through the specimen.

A test specimen according to the invention is constructed as a block of compressible material having a fabric sample embedded therein and extending transversely thereof, with opposed edges of the fabric being exposed in longtiudinally extending and opposed sides of the block, and with a compressible flange joined to the block and extending therearound intermediate said sides.

One method contemplated by the present invention for testing the permeability of such test specimens comprises the steps of providing a pressure chamber and a measuring chamber, arranging the test specimen between the chambers, hermetically sealing the chambers from each other except for possible fluid communication therebetween through the test specimen, introducing liquid into the measuring chamber to displace all the gas therefrom, introducing gas under pressure into the pressure chamber, and providing that any gas passing through said specimen will collect in the measuring chamber and displace a corresponding volume of liquid therefrom.

It is contemplated that testing apparatus be provided with a particular structural arrangement for clamping and compressing the flange of the test specimen to mount the same between the pressure and measuring chambers, with a seal around the test specimen being effected by the flange while leaving the remainder of the specimen in its normal condition and unaffected by the compression of the flange.

Further objects and advantages of the invention will be in part obvious and in part pointed out hereinafter.

The novel features of the invention may be best made clear from the following description and accompanying drawings in which:

FIGURE 1 is a perspective view of a test specimen embodying the invention;

FIGURE 2 is a fragmentary sectional view of an exemplary construction of a molding device that may be used in making the specimen of FIGURE 1;

FIGURE 3 is a vertical sectional view of a testing apparatus embodying the invention and with some parts omitted for convenience of illustration;

Figure 4:
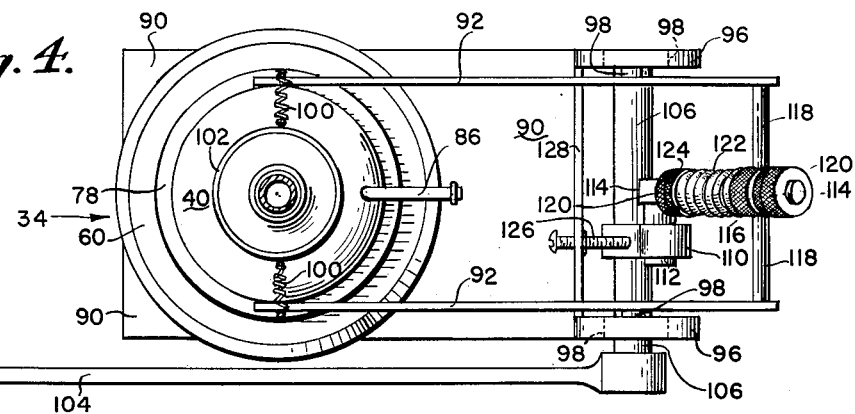
FIGURE 4 is a top plan view of the apparatus of FIGURE 3 and on a reduced scale.

Referring now to the drawings, FIGURE 1 illustrates a test specimen embodying the invention and identified by numeral 20. As shown, the specimen is composed of a central block 22 and a flange 24 extending therearound. The block 22 and flange 24 are made of a compressible material and may be of the rectangular sectional configuration shown, defining planes disposed at right angles to each other.

A fabric sample 26 is embedded in the block 22 and extends between the top 28 and bottom 30 preferably at right angles to the flange 24. The fabric sample will have opposed edges exposed in the top and bottom of the block 22 and may be arranged so that either the warp threads or the filling threads extend between the top 28 and bottom 30.

The test specimen 20 preferably is formed by molding rubber to the desired shape around the fabric sample 26. By way of example, this may be performed by utilizing mold halves such as those illustrated in FIGURE 2 and identified by numerals 32. Such mold halves will be formed with cavities therein adapted to be aligned when the mold halves are assembled together to define a combined mold cavity conforming to the shape of the specimen 20, as indicated.

In preparing a specimen, a sample of the fabric to be tested will be cut in the direction of the set of threads to be tested, i.e., in the direction of the warp or filling threads, and of a length substantially equal to the height of the mold cavity. The width of the fabric sample will be less than the width of the mold cavity, and the sample may then be placed between two pieces of uncured rubber, the total initial volume of these pieces of rubber being slightly greater than the volume of the mold cavity. This sandwich assembly is then suitably positioned in the mold and the mold halves closed to confine the assembly in the mold cavity.

It will be understood that the fabric will be impregnated with some appropriate material before forming the specimen 20; although in some cases it may be desirable to impregnate the fabric with rubber during the forming of the specimen.

The enclosed mold preferably is then inserted into a heated press (not shown) or the like in which heat and pressure will be applied to cure the specimen. The amount of heat and pressure applied, and the duration thereof, may be comparable to those conventionally used in the curing of tires. For example, the temperature may be 290° F. and the pressure 400 p.s.i. applied for a period of forty-five minutes.

During this curing step, the rubber will take the shape of the mold cavity to yield a specimen of the configuration shown in FIGURE 1. When the cured specimen is removed from the mold, the fabric normally will be completely enclosed or embedded in rubber. Small portions of the top 28 and bottom 30 of the block 22 will be cut off to expose the two opposite edges of the fabric. As previously indicated, the set of threads to be tested will extend from one exposed edge of the fabric to the other. In other words, the fabric sample 26 will be arranged so that if the warp threads are to be tested, they would be disposed in a vertical position in the mold cavity shown in FIGURE 2.

The vertical edges of the sample 26 will be spaced inwardly from the corresponding sides of the block 22, as indicated.

If desired, two or more fabric samples may be embedded in one molded specimen. This may be done by initially building up the assembly of alternating layers of rubber and fabric, so that in the finished specimen, the individual fabric samples will be separated by rubber. It will be understood that in this case, the samples will likewise extend between the top 28 and bottom 30 of the block, and have the opposed edges exposed therein.

As an example of the size of the test specimen 20 that may be satisfactorily used in the apparatus to be described hereinbelow, the block 22 may be of a height of 1½ inches, a width of 3 inches, and a thickness of one quarter of an inch, with the flange 24 also being one quarter of an inch thick and projecting laterally from the block 22 one quarter of an inch on all sides. Samples embedded in a specimen of these dimensions may be of a length of 1½ inches in the direction of the set of threads to be tested, i.e., between the top 28 and bottom 30 of the block, and of a width of 2 inches. After the curing step, one quarter of an inch may be removed from the top and bottom of the block 22, producing a finished specimen approximately 1 inch in height.

Hence, it will be observed that the aforedescribed method facilitates the preparation of test specimens wherein the impregnated fabric sample is embedded in rubber, with only two edges of the sample being exposed, while the other two edges of the sample are spaced inwardly from the corresponding edges or sides of the block 22.

As will be brought out in greater detail hereinbelow in connection with the description of the testing apparatus, the molded integral flange 24 of the test specimen provides a convenient means for clamping the specimen in a testing apparatus without causing any forces to be applied to the block portion 22 or the fabric sample 26 embedded therein.

Figure 5:
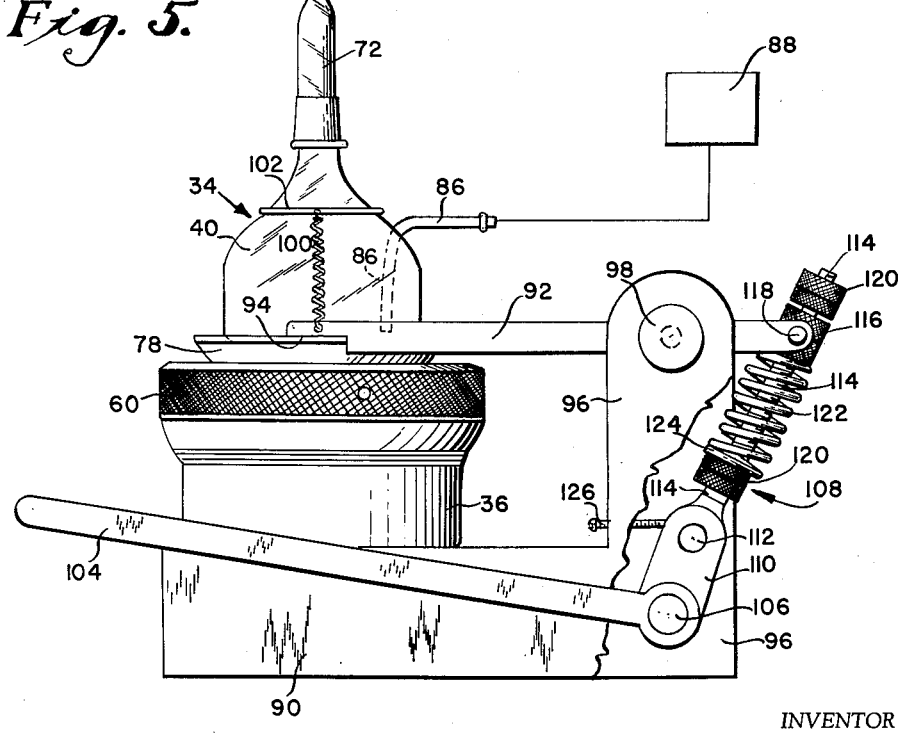
FIGURE 5 is a side elevational view of the apparatus of FIGURE 3 and also on a reduced scale.

A testing apparatus embodying the invention is illustrated in FIGURES 3, 4, and 5 and is identified by the reference numeral 34. As best seen in FIGURE 3, it includes a lower housing 36 defining a pressure chamber 38 and an upper housing 40 defining a measuring chamber 42. The housing 36 preferably is made of metal such as steel, and may be cylindrical in transverse section and of a sufficient thickness to safely withstand the operating pressures developed therein.

The housing 36 is illustrated as being closed at its lower end and open at its upper end, and is suitably connected to a source of fluid pressure, as by a conduit 44 opening thereinto through bottom wall 46 and communicating with a source of fluid pressure, such as an air compressor (not shown) or a cylinder of compressed gas (not shown). A suitable valve 48 and pressure gauge 50 are shown arranged in the conduit 44 whereby the pressure in the chamber 38 may be controlled. If compressed gas from a cylinder is used as the source of fluid pressure, the preferred gas is nitrogen.

In accordance with the invention, means are provided for hermetically sealing the chambers 38, 42 from each other and for clamping and sealingly engaging the flange 24 of the test specimen 20 to mount the latter between these two chambers so that the only possible communication therebetween will be through the fabric sample 26 embedded in the specimen.

In the illustrative embodiment of this means shown in FIGURE 3, three superimposed circular plates 52, 54, 56 are disposed in an internal annular recess 58 in the upper end of the housing 36, and a cap member 60 is threadedly engaged to the housing 36, as in the manner shown, for holding these plates in the position shown. An O-ring seal 62 or the like is provided in a groove in the bottom of the recess 58, as shown, for engagement to the bottom plate 56 whereby tightening of the flange 64 of cap 60 against the top plate 52 will deform the seal 62 into firm sealing contact with plate 56 to assure a fluid-tight joint and prevent leakage through recess 58.

The plates 52, 54, 56 are respectively provided with rectangular slots 66, 68, 70 adapted to be aligned one with the other, in the manner indicated in FIGURE 3. The slots 66, 70 in the top 52 and bottom 56 plates preferably are identical in size and may be of a width slightly greater than the thickness of the block 22 of the test specimen, and of a length slightly greater than the width of the block 22. The slot 68 in the middle plate 54 is of a width and length slightly greater than the width and length of the flange 24 of the test specimen, and of a thickness somewhat less than the thickness of the flange 24.

The slots 66, 68, 70, when the plates are assembled as shown, define a cavity generally complementary to the configuration of the specimen 20. The manner of mounting the specimen 20 in this cavity will be apparent. The block 22 will be disposed in the slots 66, 70 in the upper and lower plates, while the flange 24 will be positioned in the slot 68 in the middle plate 54. As the cap 60 is tightened to secure the plates 52, 54, 56 in desired position, the flange 24 will be clamped between and compressed by the adjacent surfaces of the top 52 and bottom 56 plates to effectively hold the specimen 20 in the position shown, and also to effect a fluid-tight seal extending completely around the block 22. Thus, the cavity in the plates 52, 54, 56 will be hermetically sealed so that the only possible communication between chambers 38, 42 will be through the fabric sample 26 in the specimen.

Because of the fact that the slots 66, 70 are slightly larger than the adjacent portions of the block 22, and since the specimen 20 is clamped and sealed in position without any compressive forces being applied to the block 22 or sample 26, both the block 22 and sample 26 will be substantially in their normal condition unaffected or uninfluenced by the compression of the flange 24 between the top 52 and bottom 56 plates.

The housing 40 preferably is made of glass or some other light transmitting material permitting visual inspection of the interior thereof. As shown, it is generally bell-shaped, open at its bottom and provided with an upper tubular portion 72 having a conventional stop cock 74 arranged therein, as indicated in FIGURE 5. For a purpose to become apparent as the description proceeds, graduations 76 are formed in the tubular portion 72, as shown.

The open bottom of the housing 40 is appropriately sealingly engaged to a ring member 78, as by being fitted into an inner annular recess 80 therein, with a suitable annular sealing means or gasket 82 being disposed in this recess in sealing engagement therewith and with the bottom of the housing 40, as shown in FIGURE 3. An O-ring seal 84 or the like is carried by the ring member 78 for sealing engagement to the top plate 52. Means, to be described in detail hereinafter, preferably are provided for moving the housing 40 and ring 78 relative to the housing 36 so that the housing 40 may be arranged in the position shown in FIGURE 3 or moved upwardly therefrom to permit disassembly of the plates 52, 54, 56 for removal or insertion of the specimen 20.

A tube 86 opens into the housing 40 and is carried thereby in sealing engagement therewith for introducing liquid in chamber 42. This tube communicates with an appropriate liquid reservoir, such as that indicated by numeral 88 in FIGURE 5. Reservoir 88 preferably is arranged for convenient movement vertically, and contains a suitable liquid which will have no solvent or swelling action on rubber, the textile fiber or filaments in the fabric sample 26, or the material with which the fabric is impregnated. Preferred liquids are absolute ethyl alcohol and absolute isopropyl alcohol.

The exemplary arrangement illustrated in the drawings for mounting the testing apparatus and for moving the housing 40 will now be described with reference to FIGURES 3–5. As best seen in FIGURE 5, the housing 36 may be mounted on a support 90. A pair of lever arms 92 straddle the housing 40 and may be suitably secured to the ring member 78 as by welding at 94 (see FIGURES 3 and 5). These levers 92 are pivotally connected to spaced uprights 96 for swinging movement about a horizontal axis. For this purpose, a trunnion 98 may be carried by each lever suitably journalled in the adjacent upright 96, as indicated, the trunnions 98 being coaxial.

Tension springs 100 are shown arranged on opposite sides of the housing 40, being attached at one end to one of the arms 92, and at the other end to a band 102 encircling the upper part of the housing, as best seen in FIGURE 3. These springs will operate to securely maintain the housing 40 in sealing engagement with the gasket 82 in the recess 80 of ring member 78.

An operating lever 104 is provided for actuating the lever arms 92 to pivot them about the axis of trunnions 98 to move the housing 40 toward or away from the housing 36. Lever 104 is shown connected to a shaft 106 journalled in and extending between the uprights 96. A toggle arrangement 108 is operatively connected to this shaft and to the free ends of levers 92. As shown, this toggle arrangement includes a crank 110 fixedly connected to the shaft 106 at its lower end and journalled at its upper end to a pin 112 attached to a rod 114. Rod 114 preferably is threaded and loosely extends through a larger hole in a block 116, the latter being suitably engaged to coaxial bars 118 joined to the free ends of the levers 92, as shown in FIGURES 4 and 5. Bars 118 may be journalled in the block 116.

Nuts 120 are shown at the upper and lower ends of rod 114, and spring 122 is arranged between the block 116 and a washer 124.

In operation, it will be evident that clockwise rotation of the lever 104, as viewed in FIGURE 5, will effect a corresponding clockwise rotation of crank 110, which in turn will cause the rod 114 to move downwardly through block 116. This downward movement of the rod will force the upper nut 120 into engagement with the block 116 and move the latter downwardly, thereby producing a clockwise pivoting of the lever arms 92 about the axis of trunnions 98. In this manner, the housing 40 and ring member 78 will be elevated away from the pressure chamber 38.

When the lever 104 is thereafter moved counterclockwise, crank 110 will be likewise moved in a counterclockwise direction to push the rod 114 upwardly, thereby compressing spring 122 to force block 116 upwardly causing the lever arms 92 to pivot counterclockwise and bring the housing 40 in position over the pressure chamber with the sealing ring 84 in engagement with the plate 52. Further downward movement of lever 104 will produce additional compression of spring 122, whereby the spring force will be transmitted through block 116 and levers 92 to firmly press the resilient sealing ring 84 against plate 52 to effect the necessary seal at this point.

A stop in the form of a screw 126 threaded into web 128 may be provided, as shown, to arrest counterclockwise rotation of crank 110 when the toggle arrangement 108 has just crossed center; i.e., when the axis of rod 114 has just moved to the left of the axis of shaft 106, as viewed in FIGURE 5. The action of spring 122 will thus operate as a lock to hold the toggle in this position, as is understood. Accordingly, the housing 40 will be effectively retained in closed, fluid-tight position.

In performing a testing operation according to a method of the invention, a specimen 20 will be prepared in the manner described above and positioned in the slots in the plates 52, 54, 56, as indicated in FIGURE 3. The lever 104 will then be moved counterclockwise to the position thereof shown in FIGURE 5 whereby the housing 40 will be positioned over the plate 52, as shown in FIGURE 3, and locked in this position by the toggle 108. With the housing 40 in this position and the stop cock 74 being open, the measuring chamber 42 is then filled with liquid, the air being displaced through the stop cock. This filling step may be performed by positioning the liquid reservoir 88 at a higher level than the measuring chamber to provide for gravity flow of the liquid into the measuring chamber.

At this time, air or gas under an appropriate pressure is then introduced into the pressure chamber 38 through conduit 44. The seal effected by the clamping action of the plates 52, 54, 56 on the flange 24 of the specimen prevents the escape of any gas to the measuring chamber through the slots in the plates; while the sealing ring 62 prevents the escape of any gas through the joint between the recess 58 and the plates. Hence, as previously indicated, the only possible fluid communication between the pressure chamber 38 and the measuring chamber 42 will be through the fabric sample 26 in the specimen. Should any gas pass through the fabric, it will appear in the liquid-filled measuring chamber as bubbles, which will rise therein and pass through the upper tubular portion and out through the stop cock.

A test is begun by closing the stop cock 74 and at the same time starting a suitable timing device (not shown). Any gas passing through the fabric sample 26 in the specimen 20 will rise and collect in the tubular portion 72 of the measuring chamber, the graduations 76 thereon being arranged to indicate suitable units of volume. The test is continued for a definite predetermined time, or until a definite volume of air or gas is collected in the tubular portion 72. It will be understood that as the gas collects in the tubular portion 72 it will displace a corresponding or equivalent volume of liquid from the measuring chamber 42 and through the tube 86. At the end of the test, the time and volume of gas are observed and measured. The results of the test may be expressed as volume of gas per unit time, in any convenient units, to provide an accurate measure of the effectiveness of the impregnation of the fabric.

By reason of the fact that the configuration of the specimen 20 and the arrangement of the sample 26 therein, together with the structure of the testing apparatus, enable the specimen 20 to be sealingly clamped in testing position by its flange 24, the sample 26 will remain in its normal condition unaffected by the compression of flange 24. Test results of a greater degree of accuracy as to actual conditions will therefore be possible.

The present invention will thus be seen to completely and effectively accomplish the objects enumerated hereinabove. It will be realized, however, that various changes and substitutions may be made to the specific embodiments disclosed herein for the purpose of illustrating the principles of this invention, without departing from these principles. Therefore, this invention includes all modifications encompassed within the spirit and scope of the following claims.

I claim:

1. A method of testing the permeability of fabrics impregnated with rubber or like material comprising the steps of: forming a test specimen by embedding a fabric sample in a block of rubber or like material and forming an outwardly extending flange completely therearound whereby two opposite edges of said fabric sample are exposed at opposite surfaces of said block and whereby said flange extends in a plane transverse to said sample; mounting said specimen in a testing apparatus by clamping and effecting a fluid-tight seal along said flange; applying fluid under pressure to one exposed edge of said fabric embedded in said specimen; and detecting any fluid passing through said fabric embedded in said specimen.

2. A device for testing the permeability of a test specimen, wherein said specimen includes a block of compressible material having a fabric sample embedded therein and a circumscribing compressible flange joined thereto, said device comprising: a housing defining a pressure chamber and having side walls, an upper end and a closed lower end; means for introducing fluid under pressure into said chamber; an annular recess at said upper end of said housing; and means for closing said upper end of said housing and for clamping said flange of said test specimen intermediate the side walls of said housing to effect a circumferential seal around said specimen and to mount it so as to expose said fabric to the interior and exterior of said chamber; said means including a plurality of superimposed plates, means for clamping said plates in said recess, each of said plates being formed with an elongated slot therein, said slots being in alignment to define a cavity the major portion of which is of cruciform sectional configuration to receive said test specimen.

3. Apparatus as in claim 2 wherein the number of said superimposed plates is three.

References Cited in the file of this patent

UNITED STATES PATENTS

| | | |
|---|---|---|
| 669,529 | Kennedy | Mar. 12, 1901 |
| 1,149,897 | Collier | Aug. 10, 1915 |
| 1,657,830 | Hopson | Jan. 31, 1928 |
| 2,171,113 | Hopkins | Aug. 29, 1939 |
| 2,608,854 | Gambrill | Sept. 2, 1952 |
| 2,665,582 | Armstrong | Jan. 12, 1954 |
| 2,799,156 | Southwick | July 16, 1957 |